United States Patent
Luo et al.

(10) Patent No.: US 10,421,463 B2
(45) Date of Patent: Sep. 24, 2019

(54) AUTOMATIC STEERING CONTROL REFERENCE ADAPTION TO RESOLVE UNDERSTEERING OF AUTONOMOUS DRIVING VEHICLES

(71) Applicants: Baidu USA LLC, Sunnyvale, CA (US); Baidu.com Times Technology (Beijing) Co., Ltd., Beijing (CN)

(72) Inventors: Qi Luo, Sunnyvale, CA (US); Qi Kong, Sunnyvale, CA (US); Fan Zhu, Sunnyvale, CA (US); Sen Hu, Sunnyvale, CA (US); Xiang Yu, Sunnyvale, CA (US); Zhenguang Zhu, Beijing (CN); Yuchang Pan, Beijing (CN); Jiarui He, Beijing (CN); Haoyang Fan, Sunnyvale, CA (US); Guang Yang, San Jose, CA (US); Jingao Wang, Sunnyvale, CA (US)

(73) Assignees: BAIDU USA LLC, Sunnyvale, CA (US); BAIDU.COM TIMES TECHNOLOGY (BEIJING) CO., LTD., Beijing (CN)

( * ) Notice: Subject to any disclaimer, the term of this patent is extended or adjusted under 35 U.S.C. 154(b) by 271 days.

(21) Appl. No.: 15/510,914

(22) PCT Filed: Mar. 10, 2017

(86) PCT No.: PCT/CN2017/076240
§ 371 (c)(1),
(2) Date: Mar. 13, 2017

(87) PCT Pub. No.: WO2018/161336
PCT Pub. Date: Sep. 13, 2018

(65) Prior Publication Data
US 2018/0297606 A1   Oct. 18, 2018

(51) Int. Cl.
*B60W 40/13* (2012.01)
*B60W 10/20* (2006.01)
(Continued)

(52) U.S. Cl.
CPC ............ *B60W 40/13* (2013.01); *B60W 10/20* (2013.01); *B62D 6/002* (2013.01); *B62D 7/159* (2013.01);
(Continued)

(58) Field of Classification Search
None
See application file for complete search history.

(56) References Cited

U.S. PATENT DOCUMENTS

| | | | | |
|---|---|---|---|---|
| 2012/0150408 A1* | 6/2012 | Takenaka | ................. | B62K 1/00 701/70 |
| 2013/0096778 A1* | 4/2013 | Goto | ...................... | B62D 5/008 701/41 |

(Continued)

*Primary Examiner* — Thomas G Black
*Assistant Examiner* — Demetra R Smith-Stewart
(74) *Attorney, Agent, or Firm* — Womble Bond Dickinson (US) LLP

(57) ABSTRACT

In one embodiment, a request is received to turn the autonomous driving vehicle (ADV) from a first direction to a second direction. In response to the request, a number of segment masses of a number of segments of the ADV are determined. The segment masses are located on a plurality of predetermined locations within a vehicle platform of the ADV. A location of a mass center for an entire ADV is calculated based on the segment masses of the segments of the ADV, where the mass center represents a center of an entire mass of the entire ADV. A steering control command based on the location of the mass center of the entire ADV for steering control of the ADV.

20 Claims, 10 Drawing Sheets

(51) Int. Cl.
*B62D 6/00* (2006.01)
*B62D 7/15* (2006.01)
*B62D 15/02* (2006.01)
*G01G 19/02* (2006.01)
*G01M 1/12* (2006.01)

(52) U.S. Cl.
CPC ....... *B62D 15/025* (2013.01); *B62D 15/0265* (2013.01); *G01G 19/021* (2013.01); *B60W 2040/1315* (2013.01); *B60W 2510/22* (2013.01); *B60W 2530/20* (2013.01); *G01M 1/12* (2013.01)

(56) References Cited

U.S. PATENT DOCUMENTS

2013/0261898 A1* 10/2013 Fujita .................... B62D 7/159
  701/42
2017/0136842 A1* 5/2017 Anderson ............ B60G 17/016

\* cited by examiner

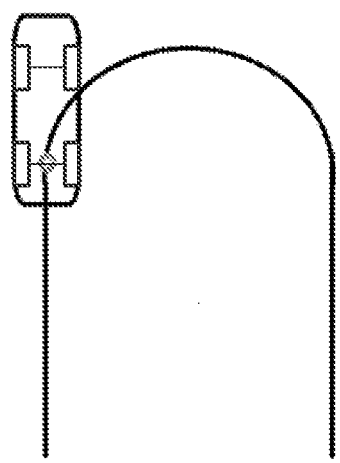 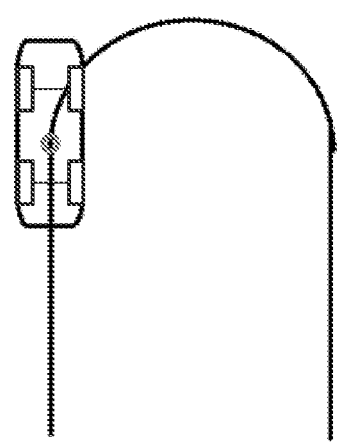
FIG. 1A
(Prior Art)
FIG. 1B

AUTOMATIC STEERING CONTROL REFERENCE ADAPTION TO RESOLVE UNDERSTEERING OF AUTONOMOUS DRIVING VEHICLES

CROSS-REFERENCE TO RELATED APPLICATION

This patent application is a U.S. National Phase Application under 35 U.S.C. § 371 of International Application No. PCT/CN2017/076240, filed Mar. 10, 2017, entitled "AUTOMATIC STEERING CONTROL REFERENCE ADAPTION TO RESOLVE UNDERSTEERING OF AUTONOMOUS DRIVING VEHICLES," which is incorporated by reference herein by its entirety.

TECHNICAL FIELD

Embodiments of the present invention relate generally to operating autonomous vehicles. More particularly, embodiments of the invention relate to steering control of autonomous driving vehicles to reduce understeering.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving, including speed control and steering control of an autonomous driving vehicle (ADV). In conventional steering control of the ADV, a rear axle is utilized as a control reference for steering. Typically, a global positioning system (GPS) sensor or receiver is located near the rear axle and the rear axle is considered as a position of the ADV. Any control command such as speed control commands or steering control commands will be determined based on the rear axle as a control reference.

However, in steering control of an ADV, using the real axle as a control reference may cause understeering at least at the beginning of turning as shown in FIG. 1A. The control system of the vehicle always tries to align the control reference on the real axle to the planned route, especially during steering control of the vehicle. As shown in FIG. 1A, due to the steering control based on the rear axle, the front portion of the vehicle is understeering by drifting off the planned steering route. The turning of the front portion of the vehicle may be delayed and the vehicle may overcorrect such understeering later on. The passengers sitting upfront may also feel uncomfortable as a result.

SUMMARY

Embodiments of the present disclosure provide a computer-implemented method for operating an autonomous driving vehicle, a non-transitory machine-readable medium, and a data processing system.

In an aspect of the disclosure, the computer-implemented method for operating an autonomous driving vehicle comprises: receiving a request to turn the autonomous driving vehicle (ADV) from a first direction to a second direction; determining a plurality of segment masses of a plurality of segments of the ADV, wherein the segment masses are located on a plurality of predetermined locations within a vehicle platform of the ADV; calculating a location of a mass center for an entire ADV based on the plurality of segment masses of the plurality of segments of the ADV, the mass center representing a center of an entire mass of the entire ADV; and generating a steering control command based on the location of the mass center of the entire ADV for steering control of the ADV.

In another aspect of the disclosure, the non-transitory machine-readable medium has instructions stored therein, which when executed by a processor, cause the processor to perform operations, the operations comprising: receiving a request to turn the autonomous driving vehicle (ADV) from a first direction to a second direction; determining a plurality of segment masses of a plurality of segments of the ADV, wherein the segment masses are located on a plurality of predetermined locations within a vehicle platform of the ADV; calculating a location of a mass center for an entire ADV based on the plurality of segment masses of the plurality of segments of the ADV, the mass center representing a center of an entire mass of the entire ADV; and generating a steering control command based on the location of the mass center of the entire ADV for steering control of the ADV.

In a further aspect of the disclosure, the data processing system comprises: a processor; and a memory coupled to the processor to store instructions, which when executed by the processor, cause the processor to perform operations, the operations including: receiving a request to turn the autonomous driving vehicle (ADV) from a first direction to a second direction, determining a plurality of segment masses of a plurality of segments of the ADV, wherein the segment masses are located on a plurality of predetermined locations within a vehicle platform of the ADV, calculating a location of a mass center for an entire ADV based on the plurality of segment masses of the plurality of segments of the ADV, the mass center representing a center of an entire mass of the entire ADV, and generating a steering control command based on the location of the mass center of the entire ADV for steering control of the ADV.

BRIEF DESCRIPTION OF THE DRAWINGS

Embodiments of the invention are illustrated by way of example and not limitation in the figures of the accompanying drawings in which like references indicate similar elements.

FIG. 1A shows a conventional steering control of an autonomous driving vehicle.

FIG. 1B shows a steering control of an autonomous driving vehicle according to one embodiment of the invention.

DETAILED DESCRIPTION

Figure 2A:
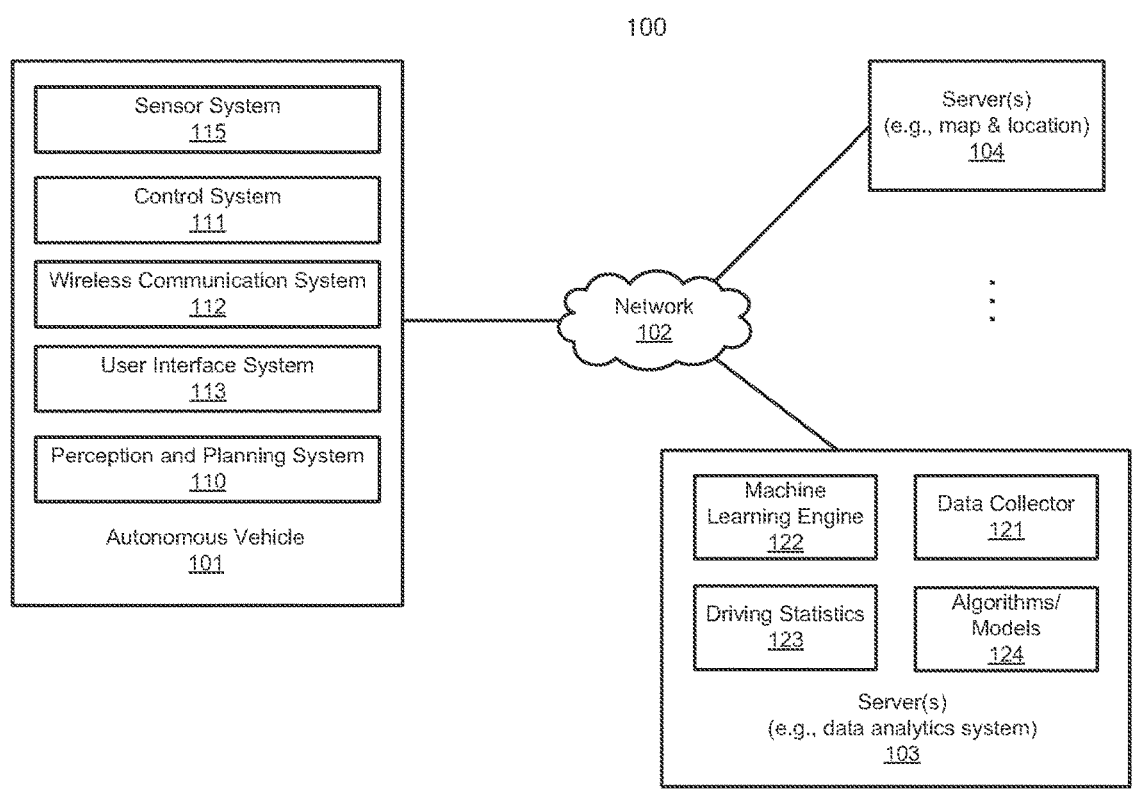
FIG. 2A is a block diagram illustrating a networked system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, when controlling steering of an ADV, a vehicle mass of the ADV is determined and a location of the vehicle mass of the entire ADV is determined. The location of the vehicle mass is utilized as a control reference (e.g., reference point and/or feedback point) for steering as shown in FIG. 1B. In this example, the center of the vehicle mass is located and indicated as a small circle near the center of the vehicle. A steering control command and/or a speed control command is generated based on the location of the vehicle mass as a control reference. The vehicle mass and its location of an ADV may be different from time to time due to a variety of factors or circumstances. For example, the vehicle mass and its location (also referred to as a mass center or center of the mass) may change due to the load of the vehicle (e.g., number of passengers, property load/unload), as well as the distribution of the loads (e.g., locations of passengers or loads within the vehicle). By dynamically determining the vehicle mass and mass center of the vehicle at the point in time of making a steering decision, a proper steering command and/or speed control command can be generated and issued to reduce an amount of understeering and discomfort to the passengers during turning.

In one embodiment, in response to a request for turning an ADV from a first direction to a second direction, a number of segment masses (also referred to as local masses) corresponding to a number of segments of the ADV are determined. The vehicle segments may be predefined. The segment masses are located at predetermined locations within the ADV. For example, an ADV may be segmented into four segments, one for each of the four wheels of the ADV. The mass center of each of the vehicle segments (referred to as a segment mass center) is predetermined, for example, based on a predetermined spot on the axle near the corresponding wheel. A location of a mass center of the entire ADV is calculated based on the segment masses of the segments of the ADV and their respective segment mass centers. The mass center represents a center of the entire mass of the entire ADV. A steering command and/or a speed control command are generated based on the location of the mass center of the entire ADV for steering control of the ADV. In addition, the gains or coefficients of certain controllers, such as a speed controller and/or a steering controller, may be updated based on the calculated vehicle mass and the location of the vehicle mass.

In one embodiment, for each of the segments of the ADV, a segment force is calculated based on the segment mass and its segment mass center, including a longitude segment force and a latitude segment force. The longitude coordinate of the mass center of the ADV is then calculated based on the longitude segment forces and the segment masses of the segments. In one embodiment, the longitude coordinate of the mass center of the ADV is determined based on a sum of longitude segment forces and a sum of segment masses of all vehicle segments. In a particular embodiment, the longitude coordinate of the mass center of the ADV is determined by dividing the sum of longitude segment forces by the sum of segment masses of all segments. Similarly, the latitude coordinate of the mass center of the ADV is calculated based on the latitude segment forces and the segment masses of the segments. In one embodiment, the latitude coordinate of the mass center of the ADV is determined based on a sum of latitude segment forces and a sum of segment masses of the vehicle segments. In a particular embodiment, the latitude coordinate of the mass center of the ADV is determined by dividing the sum of latitude segment forces by the sum of segment masses of all segments.

FIG. 2A is a block diagram illustrating an autonomous vehicle network configuration according to one embodiment of the invention. Referring to FIG. 2A, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2B:
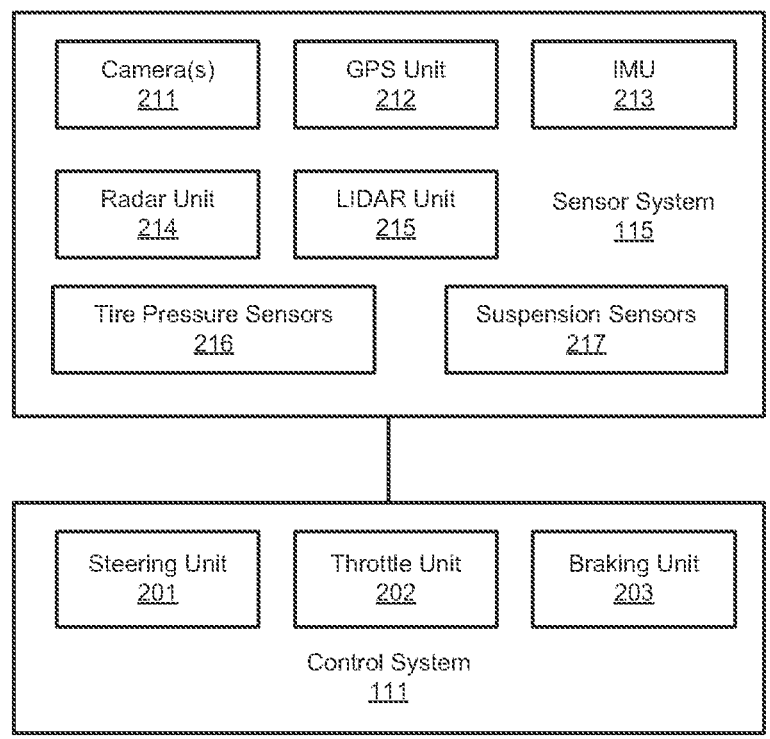
FIG. 2B is a block diagram illustrating an example of an autonomous vehicle according to one embodiment of the invention.

Referring now to FIG. 2B, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, sensor system 115 further includes one or more tire pressure sensors 216 and one or more suspension sensors 217. Each of tire pressure sensors 216 is configured to sense and measure a tire pressure of one of the wheels of the vehicle. The tire pressure of a wheel proportionally represents the load imposed on the wheel. Each of the suspension sensors 217 is configured to sense and measure an amount of suspension pressure of a suspension spring associated with an axle. The suspension data obtained from a suspension sensor represents a downward pressure from a load imposed on the suspension spring. The amount of suspension pressure received proportionally represents the amount of loads imposed on the axle.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2A may be implemented in hardware, software, or a combination thereof.

Referring back to FIG. 2A, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 performs or trains a set of rules, algorithms, and/or predictive models 124 for a variety of purposes. For example, algorithms 124 may include an algorithm to determine a segment mass of a segment of an ADV. Algorithm 124 may further include an algorithm to determine a segment force of a segment mass of a vehicle segment. Algorithm 124 may further include an algorithm to determine vehicle mass of the entire ADV and the mass center of the entire ADV.

Figure 3:
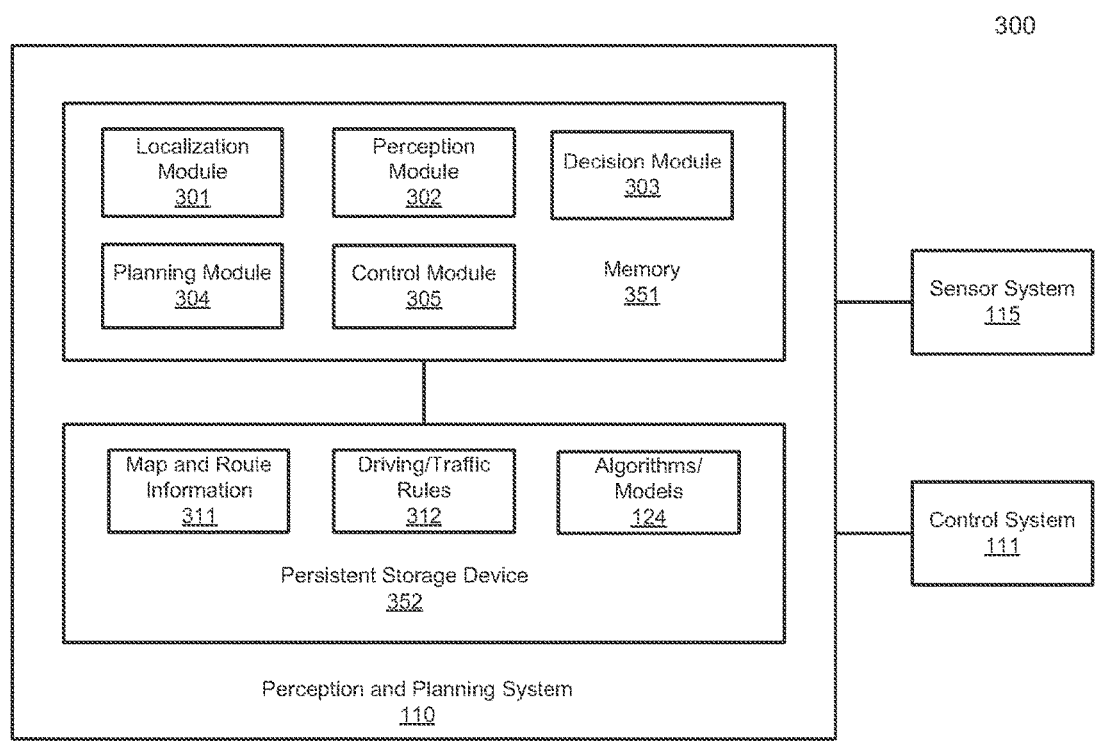
FIG. 3 is a block diagram illustrating an example of a perception and planning system used with an autonomous vehicle according to one embodiment of the invention.

FIG. 3 is a block diagram illustrating an example of a perception and planning system used with an autonomous vehicle according to one embodiment of the invention. System 300 may be implemented as a part of autonomous vehicle 101 of FIG. 2A including, but is not limited to, perception and planning system 110, control system 111, and sensor system 115. Referring to FIG. 3, perception and planning system 110 includes, but is not limited to, localization module 301, perception module 302, decision module 303, planning module 304, and control module 305.

Some or all of modules 301-305 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2A. Some of modules 301-305 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, decision module 303 makes a decision regarding how to handle the object. For example, for a particular object (e.g., another vehicle in a crossing route) as well as its metadata describing the object (e.g., a speed, direction, turning angle), decision module 303 decides how to encounter the object (e.g., overtake, yield, stop, pass). Decision module 303 may make such decisions according to a set of rules such as traffic rules or driving rules 312, which may be stored in persistent storage device 352.

Based on a decision for each of the objects perceived, planning module 304 plans a path or route for the autonomous vehicle, as well as driving parameters (e.g., distance, speed, and/or turning angle). That is, for a given object, decision module 303 decides what to do with the object, while planning module 304 determines how to do it. For example, for a given object, decision module 303 may decide to pass the object, while planning module 304 may determine whether to pass on the left side or right side of the object. Planning and control data is generated by planning module 304 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 305 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

Note that decision module 303 and planning module 304 may be integrated as an integrated module. Decision module 303/planning module 304 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 303/planning module 304 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Figure 4:
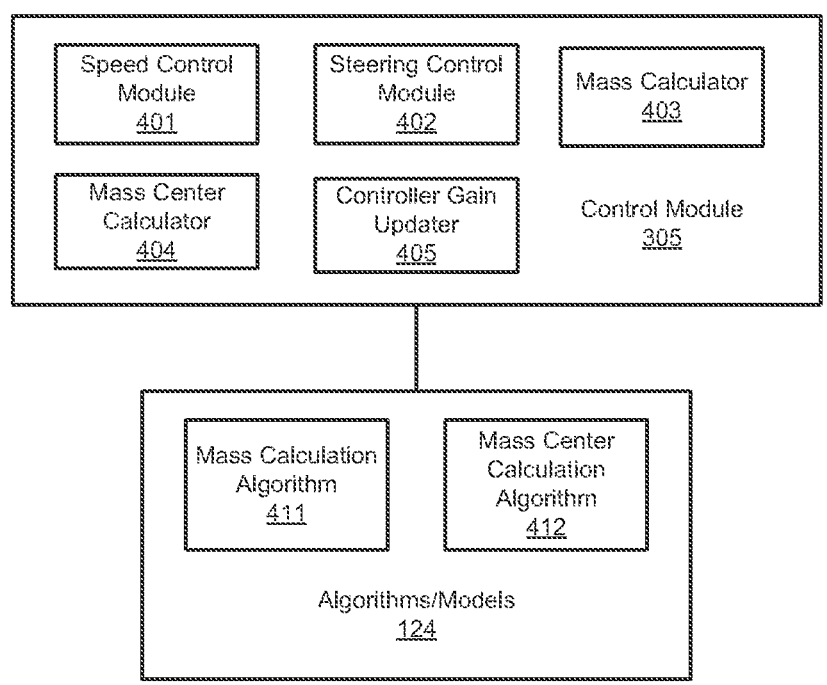
FIG. 4 is a block diagram illustrating an example of a control module according to one embodiment of the invention.

FIG. 4 is a block diagram illustrating an example of a control module according to one embodiment of the invention. Referring to FIG. 4, control module 305 includes, but is not limited to, a speed control module 401, a steering control module 402, a mass calculator or calculation module 403, a mass center calculator or calculation module 404, and a controller gain updater 405. Speed control module 401 is configured to generate and issue a speed control command to the vehicle, in response to a target speed received from planning module 304. A speed control command may cause the vehicle to accelerate by issuing a throttle command or cause the vehicle to decelerate by issuing a brake command.

Steering control module 402 is configured to control steering of the vehicle by turning the vehicle from one direction to another direction, including turning right, turning left, changing lane, or U-turn, etc. Steering control module 402 generates and issue a steering control command in response to a target turning angle received from planning module 304.

According to one embodiment, when controlling steering of an ADV, steering control module 402 and/or speed control module 401 invoke mass calculator 403 to determine a mass of the ADV and invoke mass center calculator 404 to determine a mass center of the ADV. In physics, mass is a property of a physical body (e.g., a vehicle or a segment of a vehicle). It is the measure of an object's resistance to acceleration (a change in its state of motion) when a net force is applied. It also determines the strength of its mutual gravitational attraction to other bodies. The location of the vehicle mass is utilized as a control reference (e.g., reference point and/or feedback point) for steering. The reference point refers to a reference provided by planning module 304, while the feedback point is measured and provided by IMU 213 and/or localization module 301. A steering control command and/or a speed control command is generated by steering control module 402 and speed control module 401 based on the location of the vehicle mass as a control reference.

Note that the vehicle mass and its location of an ADV may be different from time to time due to a variety of factors or circumstances. The vehicle mass and its location (also referred to as a mass center or center of the mass) may change due to the load of the vehicle (e.g., number of passengers, property load/unload), as well as the distribution of the loads (e.g., locations of passengers or loads within the vehicle). For example, the mass of a vehicle with one passenger is different than the mass of a vehicle having four passengers. In addition, if most of passengers and other loads are located near the front portion of the vehicle, the mass center of the vehicle may be located near the frontend of the vehicle. Similarly, if most of the passengers and loads are located near the rear portion of the vehicle, the mass center may be located near the backend of the vehicle.

Therefore, at different point in time or trips of the vehicle, the vehicle mass and its distribution (i.e., location of the mass) may be different. By dynamically determining the mass and mass center of the vehicle at the point in time prior to making steering, proper steering command and/or speed control commands can be generated and issued to reduce an amount of understeering and possible discomfort to the passengers. In one embodiment, the mass of the vehicle and the location of the mass may be determined at the beginning of each trip of the vehicle, cause it is assumed that the load and/or number of passengers would not change during the trip. Alternatively, the vehicle mass and its location may be determined whenever the vehicle is about to make a turn.

In one embodiment, in response to a request for turning an ADV from a first direction to a second direction, mass calculator 403 determines a number of segment masses corresponding to a number of segments of the ADV, for example, using mass calculation algorithm 411. In one embodiment, mass calculator 403 may determine a segment mass based on tire pressure data obtained from a tire pressure sensor of the corresponding wheel and/or suspension data obtained from a suspension sensor associated with the mass segment. In one embodiment, the segment masses are located at predetermined locations within the ADV. For example, an ADV may be segmented into four segments, one for each of the four wheels of the ADV. The mass center of each of the vehicle segments is predetermined, for example, on a predetermined spot on the axle near the corresponding wheel or near the suspension associated with the wheel. For example, the location of a segment mass of a vehicle segment may be the joint spot between the vehicle base platform and an axle. In one embodiment, the location of a segment mass (also referred to as a segment mass center) is located on the contacting point between a suspension spring (e.g., a steel coil spring) coupling the vehicle base platform with the axle.

Suspension is the system of tires, tire air, springs, shock absorbers and linkages that connects a vehicle to its wheels and allows relative motion between the two. Suspension systems serve a dual purpose—contributing to the vehicle's road holding/handling and braking for good active safety and driving pleasure, and keeping vehicle occupants comfortable and a ride quality reasonably well isolated from road noise, bumps, vibrations, etc.

Based on the segment masses and their respective locations, mass center calculator 404 determines a location of a mass center of the entire ADV, for example, using mass center calculation algorithm 412. The mass center of the ADV represents a center of the entire mass of the entire ADV. A steering command and/or a speed control command are generated based on the location of the mass center of the entire ADV for steering control of the ADV. In one embodiment, based on the vehicle mass and the mass center, controller gain updater 405 may update one or more gains or coefficients of a controller, such as, for example, speed control module 401 and/or steering control module 402.

In one embodiment, for each of the segments of the ADV, mass center calculator 404 calculates a segment force based on the segment mass and its location (e.g., segment mass center), including a longitude segment force and a latitude segment force. Mass center calculator 404 then calculates a longitude coordinate of the mass center of the ADV based on the longitude segment forces and the segment masses of the segments. In one embodiment, the longitude coordinate of the mass center of the ADV is determined based on a sum of longitude segment forces and a sum of segment masses of all segments.

In a particular embodiment, the longitude coordinate of the mass center of the ADV is determined by dividing the sum of longitude segment forces by the sum of segment masses of all segments. Similarly, the latitude coordinate of the mass center of the ADV is calculated based on the latitude segment forces and the segment masses of the segments. In one embodiment, the latitude coordinate of the mass center of the ADV is determined based on a sum of latitude segment forces and a sum of segment masses of all segments. In a particular embodiment, the latitude coordinate of the mass center of the ADV is determined by dividing the sum of latitude segment forces by the sum of segment masses of all segments.

Figure 5:
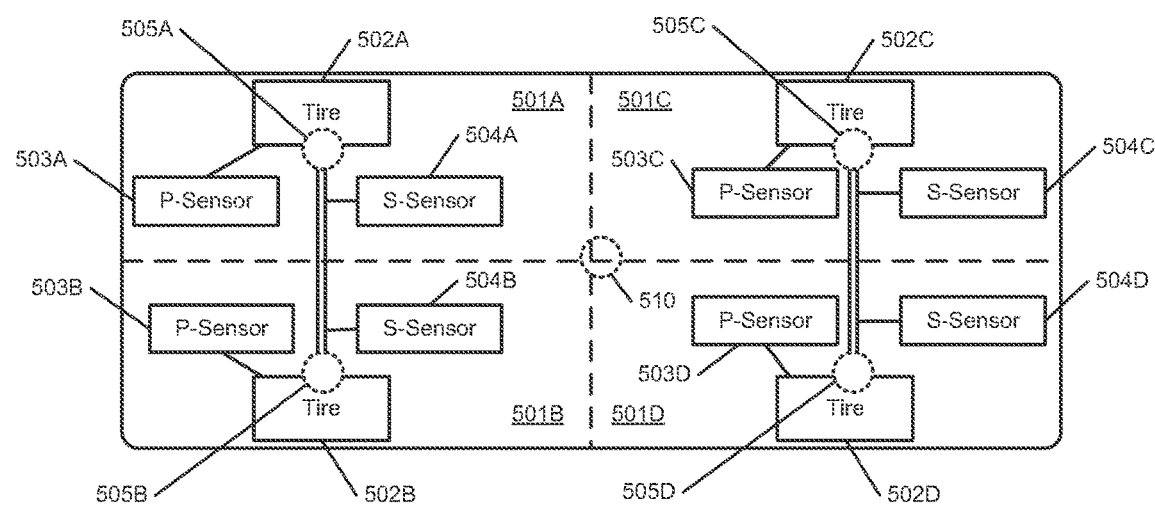
FIG. 5 is a block diagram of an autonomous driving vehicle according to one embodiment of the invention.

FIG. 5 is a block diagram of an autonomous driving vehicle according to one embodiment of the invention. ADV 500 may represent any of the ADVs described above. Referring to FIG. 5, ADV 500 is partitioned into multiple vehicle segments, in this example, four segments 501A-501D. However, more or fewer segments may be defined. In this embodiment, each of segments 501A-501D is associated with one of the tires or wheels 502A-502D respectively. In one embodiment, segment mass centers 505A-505D of segments 501A-501D are predetermined as fixed locations within vehicle 500 (e.g., fixed x, y coordinates). However, the corresponding segment mass may be different from one vehicle segment to another vehicle segment dependent upon the load imposed on the corresponding vehicle segment. As a result, the overall mass and the location of the overall mass of entire vehicle may be different.

In order to determine a segment mass, mass calculator 403 reads tire pressure data from a tire pressure sensor of a wheel corresponding to the segment mass. Mass calculator 403 then calculates the segment mass based on the tire pressure data. The rationale behind this is that the tire pressure proportionally represents an amount of load imposed on the tire or wheel. Higher tire pressure indicates a heavier load imposed on the tire. For example, mass calculator 403 reads tire pressure data for tires 502A-502D via tire pressure sensors 503A-503D respectively and calculates segment masses for vehicle segments 501A-501D based on the respective tire pressure data. Tire pressure sensors 503A-503D may be a part of tire pressure sensors 216 of FIG. 2B.

In addition, according to another embodiment, mass calculator 403 reads suspension data from suspension sensors 504A-504D for vehicle segments 501A-501D respectively. Suspension sensors 504A-504D may be a part of suspension sensors 217 of FIG. 2B. Mass calculator 403 then calculates the segment masses for vehicle segments 501A-501D based on the respective tire pressure data and the suspension data. Similar to tire pressure, suspension data of a suspension associated with a wheel can indicate an amount of load imposed on the corresponding suspension. For example, based on how much or how far of a suspension spring has been compressed or bent, a load imposed on the suspension can be estimated using a predetermined algorithm. In other words, the degree of compression or bending of a suspension is proportional an amount of load applied on the suspension.

In one embodiment, the tire pressure data may be utilized as a base in calculating a segment mass, while the suspension data may be utilized as data to correct or validate the calculated segment mass. The tire pressure data is usually more stable and less sensitive to vibration or bumps. As a result, the tire pressure data can be utilized as a baseline, where tire pressure of each wheel is proportional to the respective local/segment mass. However, the tire pressure data sometimes is not accurate enough and thus, the suspension data can be utilized to complement the tire pressure data in determining a segment mass. In processing of suspension data, the suspension data may be processed using a low-pass filter to remove any unnecessary noise. A segment mass can be calculated based on a weighted sum of the tire pressure data and the processed suspension data as follows:

$$\text{Segment mass}(x) = w1 * \text{tire\_pressure\_data}(x) + w2 * \text{suspension\_data}(x)$$

where x represents a particular vehicle segment or wheel and w1 and w2 are weight factors, which may be trained offline based on a large amount of driving statistics by a data analytics system such as data analytics system 103.

Once the segment masses for vehicle segments 501A-501D have been determined, mass center calculator 404 calculates a mass center of the entire vehicle based on the segment masses in view of their relative positions or locations of the segment masses. In one embodiment, for each of vehicle segments 501A-501D, mass center calculator 404 calculates a segment force based on coordinates of the segment mass center such as segment mass centers 505A-505D. Particularly, mass center calculator 404 calculates a longitude segment force based on a longitude (Y) of the segment mass center and the segment mass. Mass center calculator 404 further calculates a latitude segment force based on a latitude (X) of the segment mass center and the segment mass. The longitude of vehicle mass center 510 is then calculated based on a sum of the longitude forces of the vehicle segments and a sum of their respective segment masses. The latitude of vehicle mass center 510 is then calculated based on a sum of the latitude forces of the vehicle segments and a sum of their respective segment masses.

For the purpose of illustration, it is assumed the coordinates of segment mass centers 505A-505D are (Xa, Ya), (Xb, Yb), (Xc, Yc), and (Xd, Yd), respectively. The masses for vehicle segments 501A-501D are Ma, Mb, Mc, and Md, respectively. A longitude segment force for vehicle segment 501A may be calculated as (Ya*Ma). A latitude segment force for vehicle segment 501A may be calculated as (Xa*Ma). The segment forces for other vehicle segments 501B-501D may also be calculated similarly. The latitude (X) of the mass center for the entire ADV 500 may be determined as X=(Xa*Ma+Xb*Mb+Xc*Mc+Xd*Md)/(Ma+Mb+Mc+Md). The longitude (Y) of the mass center for the entire ADV 500 may be determined as Y=(Ya*Ma+Yb*Mb+Yc*Mc+Yd*Md)/(Ma+Mb+Mc+Md). Thereafter, the steering control commands and/or speed control commands can be generated based on mass center 510 (X, Y) as a control reference. Again although mass center 510 is shown as near the center of the vehicle in FIG. 5. However, mass center 510 can be off center dependent upon the load distribution as described above.

Figure 6:
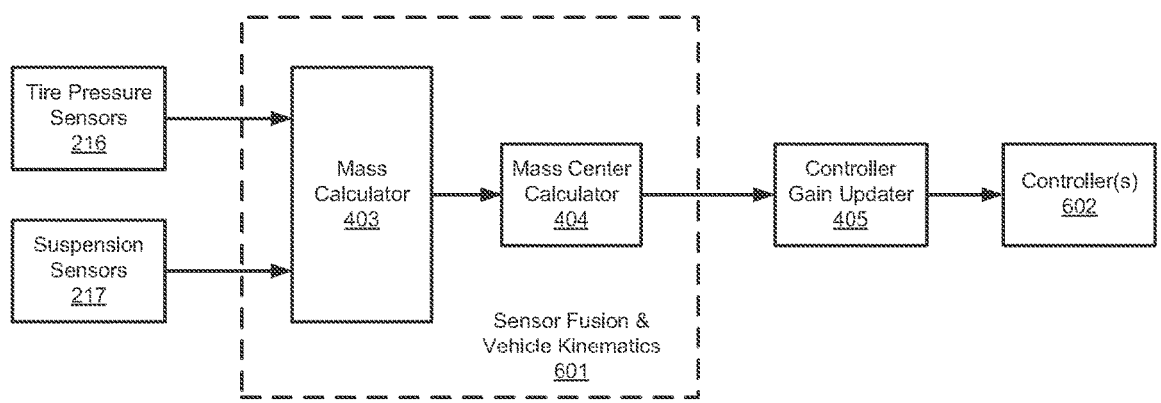
FIG. 6 is a processing flow of updating a gain of a controller based on the vehicle mass and the mass center according to one embodiment of the invention.

According to one embodiment, once the mass center coordinates (X, Y) has been determined, one or more coefficients of speed control module 401 and/or steering control module 402 may be adjusted. FIG. 6 is a block diagram illustrating a processing flow for updating gains or coefficients of a controller according to one embodiment of the invention. Referring to FIG. 6, mass calculator 403 and mass center calculator 404 are implemented as a part of sensor fusion and vehicle Kinematics logic or block 601. Based on tire pressure data provided by tire pressure sensors 216 and suspension data provided by suspension sensors 217, sensor fusion and vehicle Kinematics block 601 determines segment mass of the vehicle segments and the mass center of the entire vehicle as described above. The mass center of the vehicle is utilized by controller gain updater 405 to update a gain or coefficient of controller 602, such as speed controller 401 and steering controller 402.

Sensor fusion is combining of sensory data or data derived from disparate sources such that the resulting information has less uncertainty than would be possible when these sources were used individually. The term uncertainty reduction in this case can mean more accurate, more complete, or more dependable, or refer to the result of an emerging view, such as stereoscopic vision (calculation of depth information by combining two-dimensional images from two cameras at slightly different viewpoints). Kinematics is the branch of classical mechanics which describes the motion of points (alternatively "particles"), bodies (objects), and systems of bodies without consideration of the masses of those objects nor the forces that may have caused the motion.

In one embodiment, a coefficient or gain of speed control module 401 is adjusted based on the vehicle mass of the entire ADV (Ma+Mb+Mc+Md), because typically, the vehicle mass will like affect the acceleration and deceleration rates. For example, if the ADV is heavy, it will take a longer time to accelerate to reach a higher target speed. It will also take a longer time to decelerate to reach a lower target speed or make a full stop. In one embodiment, a coefficient or gain of steering control module 402 may be modified based on the mass center coordinates of the ADV (X, Y), because the mass center coordinates will likely affect the steering angles and/or speed of the ADV when making a turn.

In one embodiment, any of speed control module 401 and steering control module 402 may include a proportional-integral-derivative (PID) controller (not shown). The PID controller may be modeled by proportional, integral, and derivative coefficients. These coefficients may be initially configured offline by a data analytics system based on a large amount of driving statistics, such as, for example data analytics system or server 103, as follows:

$$u(t) = K_p e(t) + K_i \int_0^t e(t)dt + K_d \frac{de(t)}{dt}$$

where $K_p$, $K_i$, and $K_d$ are the proportional, integral, and derivative coefficients of the PID controller.

A PID is a control loop feedback mechanism (controller) commonly used in industrial control systems. A PID controller continuously calculates an error value as the difference between a desired set point and a measured process variable and applies a correction based on proportional (Kp), integral (Ki), and derivative (Kd) terms. A PID controller continuously calculates an error value as the difference between a desired set point (e.g., target speed, target steering angle from planning module 304) and a measured process variable (e.g., actual speed, actual steering angle measured from the vehicle) and applies a correction based on proportional, integral, and derivative terms. The controller attempts to minimize the error over time by adjustment of a control variable to a new value determined by a weighted sum.

In one embodiment, the calculated vehicle mass of the entire ADV (Ma+Mb+Mc+Md) may be utilized to adjust coefficients Kp and/or Ki of a PID controller of speed control module 401. The calculated mass center (X,Y) may be utilized to modify coefficients Kp and/or Ki of a PID controller of steering control module 402. Particularly for steering control, the mass distribution can be utilized to calculate the rotational inertia of the vehicle. Kp and/or Ki of steering controller can be adjusted proportional to the rotational inertia of the vehicle. Rotational inertia refers to is a tensor that determines the torque needed for a desired angular acceleration about a rotational axis. It depends on the body's mass distribution and the axis chosen, with larger moments requiring more torque to change the body's rotation.

Torque refers to the tendency of a force to rotate an object around an axis, fulcrum, or pivot. Just as a force is a push or a pull, a torque can be thought of as a twist to an object. Loosely speaking, torque is a measure of the turning force on an object such as a bolt or a flywheel. The magnitude of torque depends on three quantities: the force applied, the length of the lever arm connecting the axis to the point of force application, and the angle between the force vector and the lever arm.

Note that the determination of the vehicle mass and its location, as well as adjusting Kp and Ki of the controllers, can be performed at the beginning of each trip of the vehicle. It is assumed that during the trip, the mass (e.g., load, number of passengers) would not change dramatically. Alternatively, such determination may be performed periodically during the trip or in response to a request to turn the vehicle from one direction to another direction.

Figure 7:
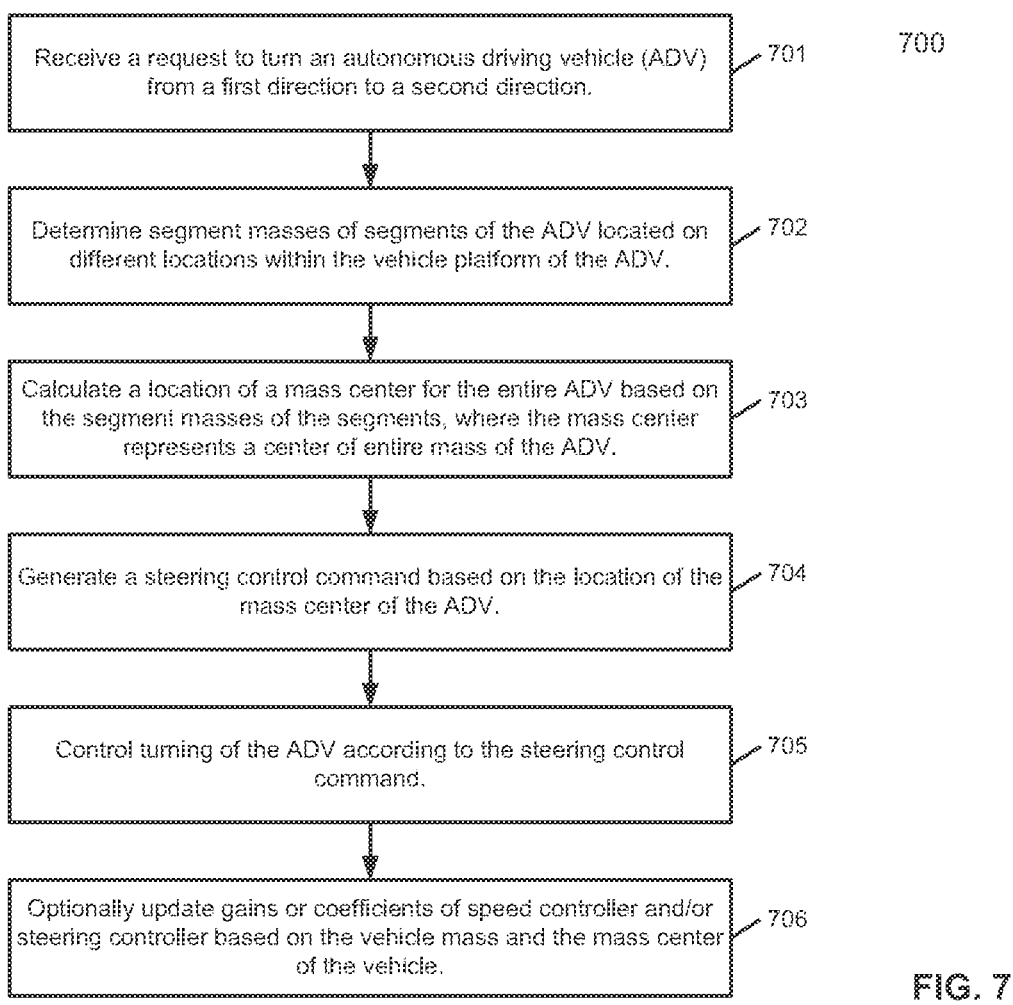
FIG. 7 is a flow diagram illustrating a process of operating an autonomous driving vehicle according to one embodiment of the invention.

FIG. 7 is a flow diagram illustrating a process of operating an autonomous driving vehicle according to one embodiment of the invention. Process 700 may be performed by processing logic which may include software, hardware, or a combination thereof. For example, process 600 may be performed by control module 305. Referring to FIG. 7, in operation 701, processing logic receives a request to turn an ADV from a first direction to a second direction (e.g., turning left, turning right, changing lane, or U-turn). In response to the request, in operation 702, processing logic determines segment masses of a number of vehicle segments of the ADV, where the segment masses are located at predetermined locations within the vehicle platform of the ADV. In operation 703, processing logic calculates a location of a mass center for the entire ADV based on the segment masses and their respective locations. The mass center location represents a center of the entire mass of the entire ADV. In operation 704, a steering control command and/or speed control command are generated based on the vehicle mass and the mass center of the entire ADV. In operation 705, processing logic controls turning of the ADV according to the steering control command and/or speed control command. In operation 706, a gain or coefficient of a controller (e.g., speed controller, steering controller) may be updated based on the vehicle mass and the mass center of the vehicle.

Figure 8:
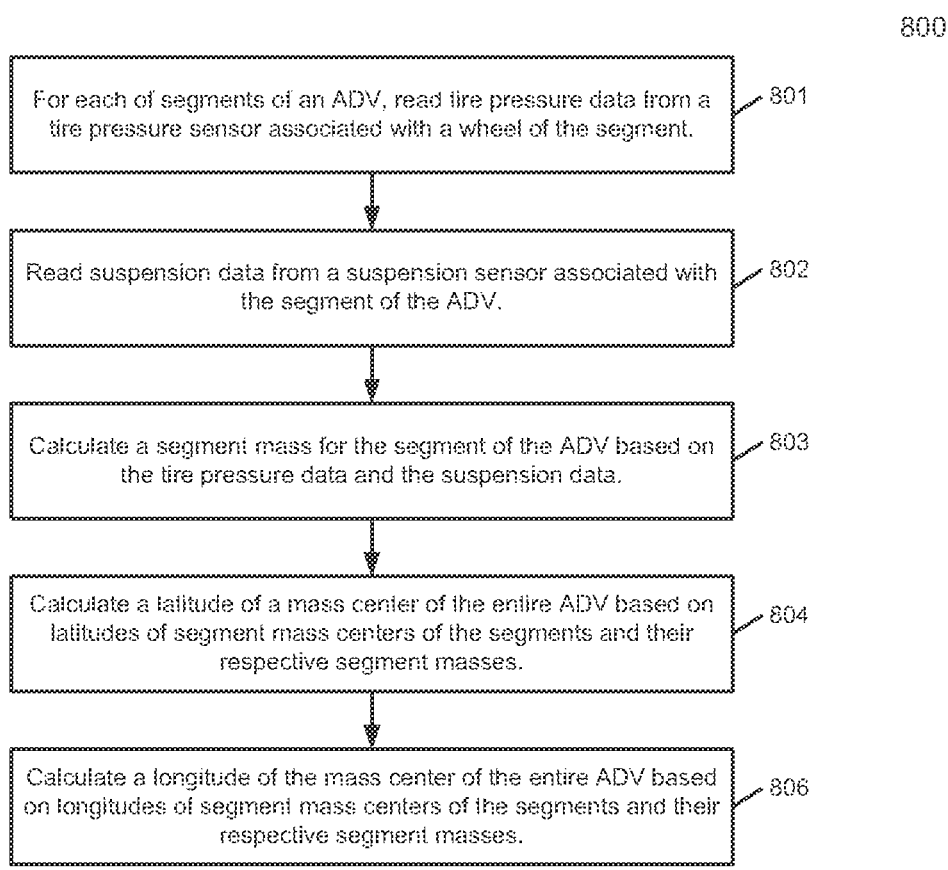
FIG. 8 is a flow diagram illustrating a process of operating an autonomous driving vehicle according to one embodiment of the invention.

FIG. 8 is a flow diagram illustrating a process of operating an autonomous driving vehicle according to one embodiment of the invention. Process 800 may be performed as a part of operations involved in operations 602-603. Referring to FIG. 8, for each of vehicle segments, in operation 801, processing logic reads tire pressure data from a tire pressure sensor associated with a tire or wheel of the vehicle segment. In operation 802, processing logic reads suspension data from a suspension sensor associated with the vehicle segment of the ADV. In operation 803, processing logic calculates a segment mass of the vehicle segment of the ADV based on the tire pressure data and suspension data using a predetermined algorithm. The operations 801-803 may be iteratively performed for each of the vehicle segments. In operation 804, processing logic calculates a latitude of a mass center of the entire ADV based on the latitudes of the segment mass centers of the vehicle segments and their respective segment masses. In operation 805, processing logic calculates a longitude of a mass center of the entire ADV based on the longitude of the segment mass centers of the vehicle segments and their respective segment masses.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 9:
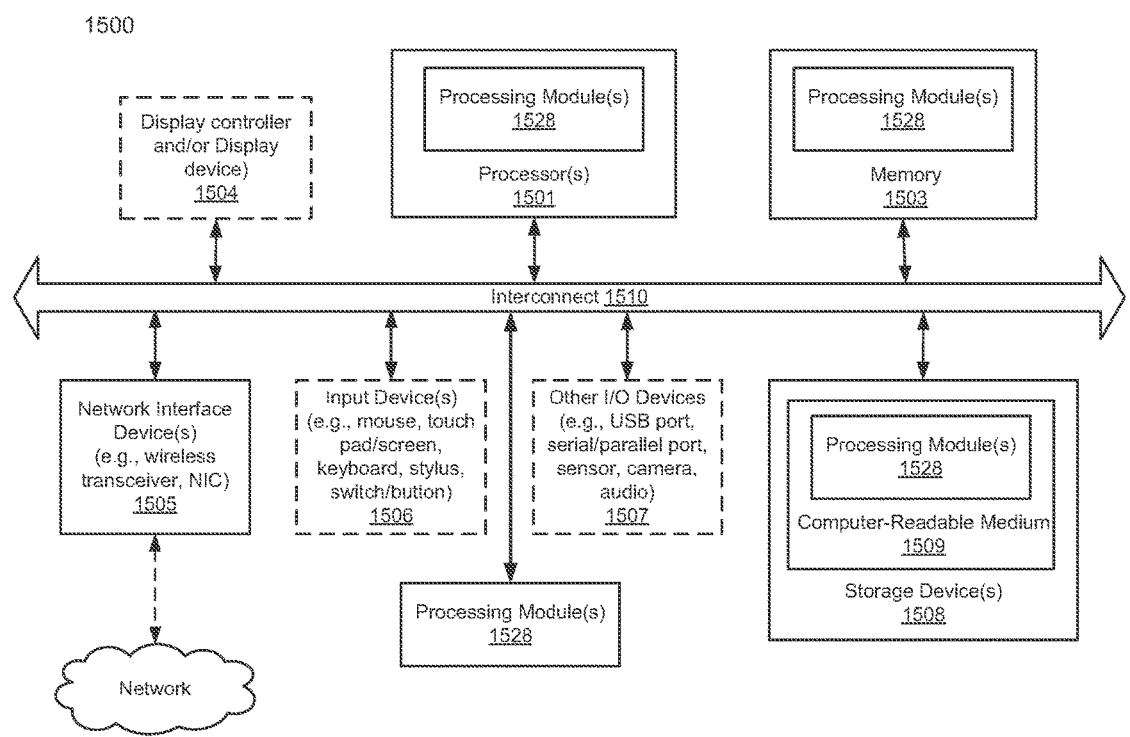
FIG. 9 is a block diagram illustrating a data processing system according to one embodiment.

FIG. 9 is a block diagram illustrating an example of a data processing system which may be used with one embodiment of the invention. For example, system 1500 may represent any of data processing systems described above performing any of the processes or methods described above, such as, for example, perception and planning system 110 or any of servers 103-104 of FIG. 2A. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 304 and/or control module 305. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for operating an autonomous driving vehicle, comprising:
    receiving a request to turn the autonomous driving vehicle (ADV) from a first direction to a second direction;
    determining a plurality of segment masses of a plurality of segments of the ADV, wherein the segment masses are located on a plurality of predetermined locations within a vehicle platform of the ADV;
    calculating a location of a mass center for an entire ADV based on the plurality of segment masses of the plurality of segments of the ADV, the mass center representing a center of an entire mass of the entire ADV, wherein the location of the mass center of the entire ADV is determined based on the plurality of segment masses in view of relative locations of the segment masses using a predetermined algorithm; and
    generating a steering control command based on the location of the mass center of the entire ADV for steering control of the ADV.

2. The method of claim 1, wherein each of the plurality of segments of the ADV is defined within a proximity of one of a plurality of wheels of the ADV.

3. The method of claim 1, further comprising:
    for each of the segment masses, calculating a longitude segment force based on the segment mass and a longitude coordinate of the corresponding segment mass; and
    determining a longitude coordinate of the mass center of the entire ADV based on a sum of the longitude segment forces and a sum of the segment masses.

4. The method of claim 3, wherein determining a longitude coordinate of the mass center comprises dividing the sum of the longitude segment forces by the sum of the segment masses.

5. The method of claim 1, further comprising:
    for each of the segment masses, calculating a latitude segment force based on the segment mass and a latitude coordinate of the corresponding segment mass; and
    determining a latitude coordinate of the mass center of the entire ADV based on a sum of the latitude segment forces and a sum of the segment masses.

6. The method of claim 5, wherein determining a latitude coordinate of the mass center comprises dividing the sum of the latitude segment forces by the sum of the segment masses.

7. A computer-implemented method for operating an autonomous driving vehicle, comprising:
    receiving a request to turn the autonomous driving vehicle (ADV) from a first direction to a second direction;
    determining a plurality of segment masses of a plurality of segments of the ADV, wherein the segment masses are located on a plurality of predetermined locations within a vehicle platform of the ADV, wherein determining the plurality of segment masses of a plurality of segments of the ADV comprises:
        for each of the segments of the ADV, reading tire pressure data from a tire pressure sensor associated with a wheel corresponding to the segment; and
        calculating a corresponding segment mass based on the tire pressure data;
    calculating a location of a mass center for the entire ADV based on the plurality of segment masses of the plurality of segments of the ADV, the mass center representing a center of an entire mass of the entire ADV; and
    generating a steering control command based on the location of the mass center of the entire ADV for steering control of the ADV.

8. The method of claim 7, further comprising:
    reading suspension data from a suspension sensor associated with the wheel of the corresponding segment; and
    calculating the corresponding segment mass based on the tire pressure data and the suspension data.

9. A non-transitory machine-readable medium having instructions stored therein, which when executed by a processor, cause the processor to perform operations, the operations comprising:
    receiving a request to turn the autonomous driving vehicle (ADV) from a first direction to a second direction;
    determining a plurality of segment masses of a plurality of segments of the ADV, wherein the segment masses are located on a plurality of predetermined locations within a vehicle platform of the ADV: and
    calculating a location of a mass center for an entire ADV based on the plurality of segment masses of the plurality of segments of the ADV, the mass center representing a center of an entire mass of the entire ADV, wherein the location of the mass center of the entire ADV is determined based on the plurality of segment masses in view of relative locations of the segment masses using a predetermined algorithm; and
    generating a steering control command based on the location of the mass center of the entire ADV for steering control of the ADV.

10. The machine-readable medium of claim 9, wherein each of the plurality of segments of the ADV is defined within a proximity of one of a plurality of wheels of the ADV.

11. The machine-readable medium of claim 9, wherein the operations further comprise:
    for each of the segment masses, calculating a longitude segment force based on the segment mass and a longitude coordinate of the corresponding segment mass; and
    determining a longitude coordinate of the mass center of the entire ADV based on a sum of the longitude segment forces and a sum of the segment masses.

12. The machine-readable medium of claim 11, wherein determining a longitude coordinate of the mass center comprises dividing the sum of the longitude segment forces by the sum of the segment masses.

13. The machine-readable medium of claim 9, wherein the operations further comprise:
for each of the segment masses, calculating a latitude segment force based on the segment mass and a latitude coordinate of the corresponding segment mass; and
determining a latitude coordinate of the mass center of the entire ADV based on a sum of the latitude segment forces and a sum of the segment masses.

14. The machine-readable medium of claim 13, wherein determining a latitude coordinate of the mass center comprises dividing the sum of the latitude segment forces by the sum of the segment masses.

15. A non-transitory machine-readable medium having instructions stored therein, which when executed by a processor, cause the processor to perform operations for operating an autonomous driving vehicle, the operations comprising:
receiving a request to turn the autonomous driving vehicle (ADV) from a first direction to a second direction;
determining a plurality of segment masses of a plurality of segments of the ADV, wherein the segment masses are located on a plurality of predetermined locations within a vehicle platform of the ADV, wherein determining the plurality of segment masses of a plurality of segments of the ADV comprises:
for each of the segments of the ADV, reading tire pressure data from a tire pressure sensor associated with a wheel corresponding to the segment; and
calculating a corresponding segment mass based on the tire pressure data;
calculating a location of a mass center for an entire ADV based on the plurality of segment masses of the plurality of segments of the ADV, the mass center representing a center of an entire mass of the entire ADV; and
generating a steering control command based on the location of the mass center of the entire ADV for steering control of the ADV.

16. The machine-readable medium of claim 15, wherein the operations further comprise:
reading suspension data from a suspension sensor associated with the wheel of the corresponding segment; and
calculating the corresponding segment mass based on the tire pressure data and the suspension data.

17. A data processing system, comprising:
a processor; and
a memory coupled to the processor to store instructions, which when executed by the processor, cause the processor to perform operations, the operations including receiving a request to turn the autonomous driving vehicle (ADV) from a first direction to a second direction,
determining a plurality of segment masses of a plurality of segments of the ADV, wherein the segment masses are located on a plurality of predetermined locations within a vehicle platform of the ADV,
calculating a location of a mass center for an entire ADV based on the plurality of segment masses of the plurality of segments of the ADV, the mass center representing a center of an entire mass of the entire ADV, wherein the location of the mass center of the entire ADV is determined based on the plurality of segment masses in view of relative locations of the segment masses using a predetermined algorithm, and
generating a steering control command based on the location of the mass center of the entire ADV for steering control of the ADV.

18. The system of claim 17, wherein each of the plurality of segments of the ADV is defined within a proximity of one of a plurality of wheels of the ADV.

19. A data processing system, comprising:
a processor; and
a memory coupled to the processor to store instructions, which when executed by the processor, cause the processor to perform operations, the operations including receiving a request to turn the autonomous driving vehicle (ADV) from a first direction to a second direction,
determine a plurality of segment masses of a plurality of segments of the ADV, wherein the segment masses are located on a plurality of predetermined locations within a vehicle platform of the ADV, wherein determining the plurality of segment masses of a plurality of segments of the ADV comprises:
for each of the segments of the ADV, reading tire pressure data from a tire pressure sensor associated with a wheel corresponding to the segment; and
calculating a corresponding segment mass based on the tire pressure data
calculate a location of a mass center for an entire ADV based on the plurality of segment masses of the plurality of segments of the ADV, the mass center representing a center of an entire mass of the entire ADV, and
generate a steering control command based on the location of the mass center of the entire ADV for steering control of the ADV.

20. The system of claim 19, wherein the operations further comprise:
reading suspension data from a suspension sensor associated with the wheel of the corresponding segment; and
calculating the corresponding segment mass based on the tire pressure data and the suspension data.

* * * * *